(12) United States Patent
Wagener

(10) Patent No.: US 7,655,865 B2
(45) Date of Patent: Feb. 2, 2010

(54) APPARATUS FOR MOUNTING BUSBARS

(75) Inventor: Hans Wagener, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 11/793,320

(22) PCT Filed: Feb. 10, 2006

(86) PCT No.: PCT/EP2006/001253
§ 371 (c)(1),
(2), (4) Date: Jul. 8, 2008

(87) PCT Pub. No.: WO2006/094597
PCT Pub. Date: Sep. 14, 2006

(65) Prior Publication Data
US 2008/0257602 A1 Oct. 23, 2008

(30) Foreign Application Priority Data
Mar. 5, 2005 (DE) .................. 10 2005 010 219

(51) Int. Cl.
H02G 5/00 (2006.01)
(52) U.S. Cl. .................................... 174/99 B
(58) Field of Classification Search ............. 174/88 B, 174/99 B; 439/116
See application file for complete search history.

(56) References Cited

U.S. PATENT DOCUMENTS 5,008,494 A * 4/1991 Wagener .................... 174/68.2
6,069,321 A * 5/2000 Wagener et al. ........... 174/99 B
7,448,885 B2 * 11/2008 Wagener ..................... 439/116

FOREIGN PATENT DOCUMENTS

| DE | 1 515 485 | 7/1969 |
| DE | 39 22 690 C1 | 9/1990 |
| DE | 43 12 480 C2 | 12/1994 |
| EP | 0 745 505 A1 | 12/1996 |

OTHER PUBLICATIONS

Rittal Handbuch 29, Sep. 1997, pp. 546, 552-553.
Von Bruno Bührer, "Kurzschlußprüfungen am modularen Niederspannungs-schaltanlagensystem MNS", 1979 pp. 173-177.
Rittal Stromverteilungs-Komponenten SV "Individuell . . ." specification sheets, Jul. 2000 (12 pages).

* cited by examiner

Primary Examiner—Chau N Nguyen
(74) Attorney, Agent, or Firm—Pauley Petersen & Erickson

(57) ABSTRACT

An apparatus for mounting bus bars having at least one bus bar holder which can be attached to a loadbearing structure and which has at least one foot receptacle for introducing a foot section of a bus bar and fixing the latter by a holding piece. Simple, stable mounting of bus bars can be achieved if the holding piece is configured as a separate part which can be attached releasably or which is attached releasably to a base part of the bus bar holder and which has a connecting section for attachment to an adapted holding piece receptacle of the base part and a head part which engages over the former for fixing the foot section.

20 Claims, 9 Drawing Sheets

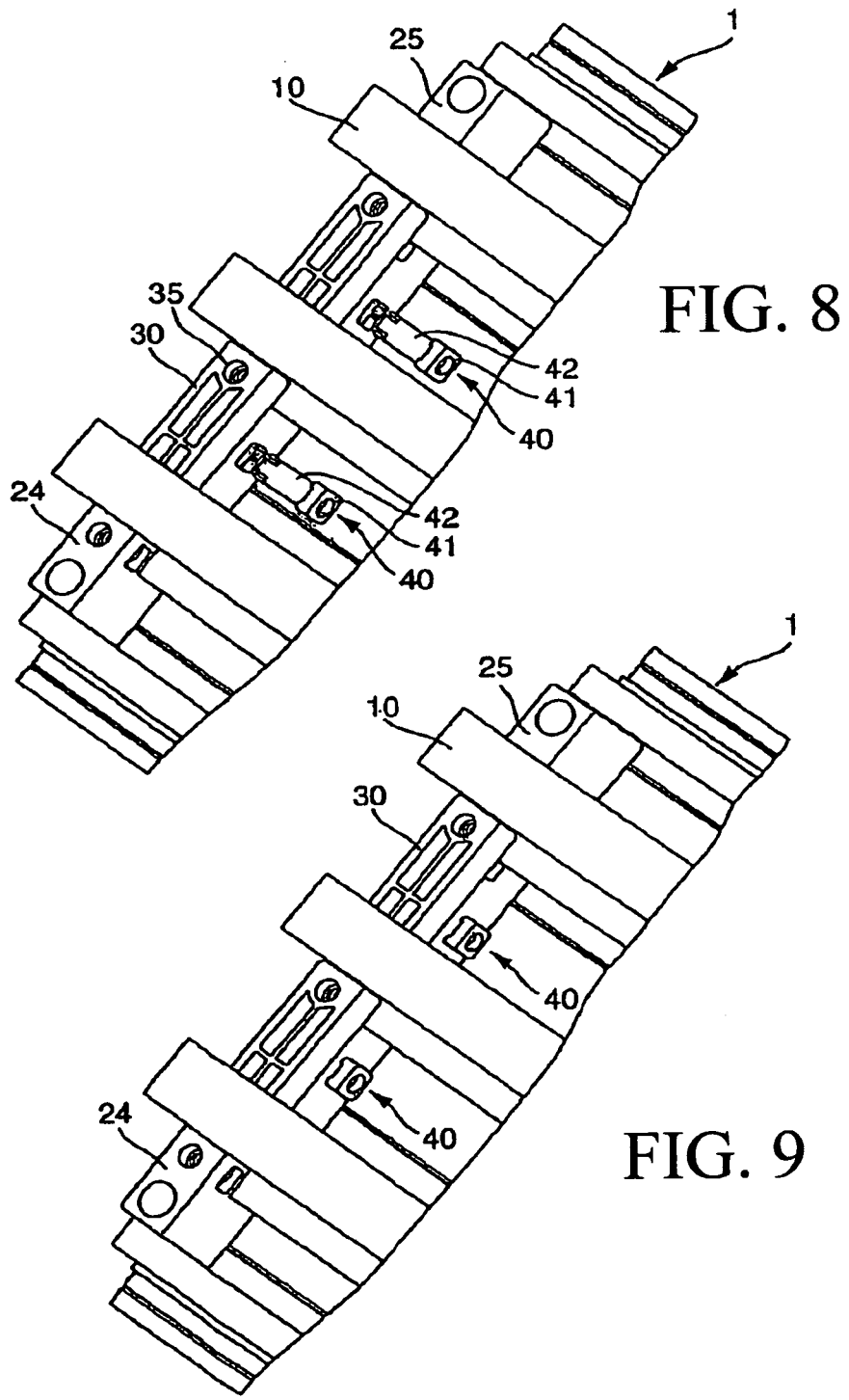

FIG. 13
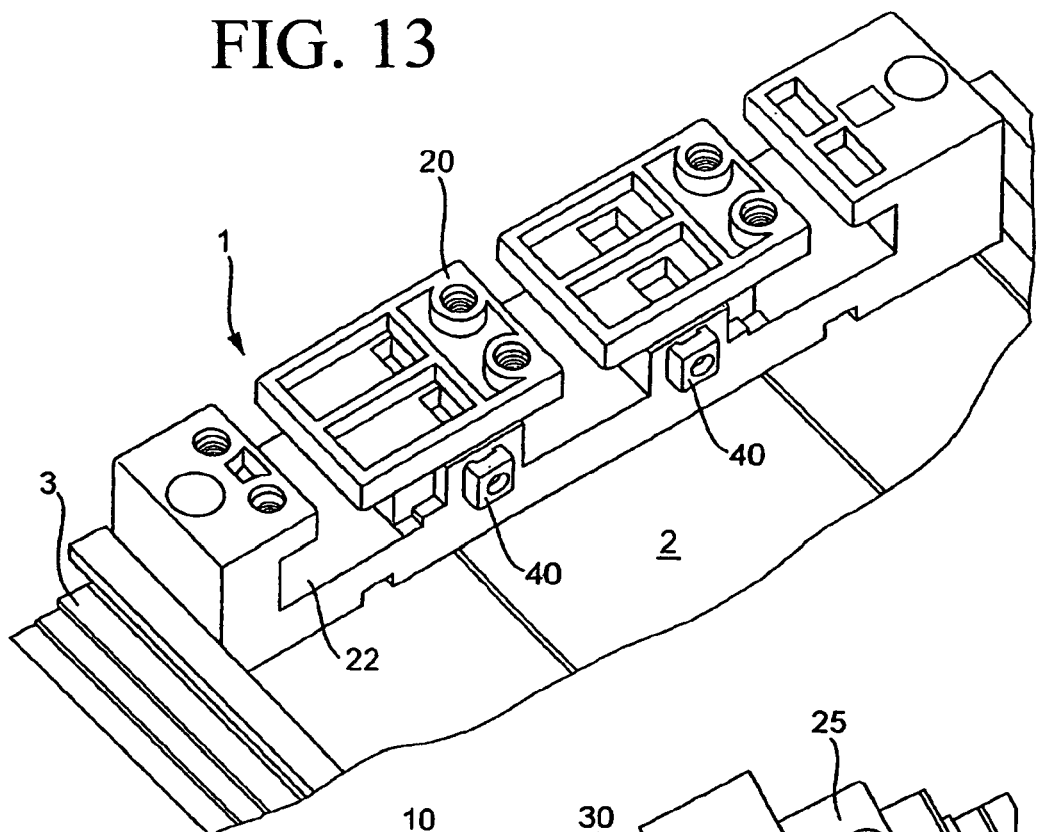
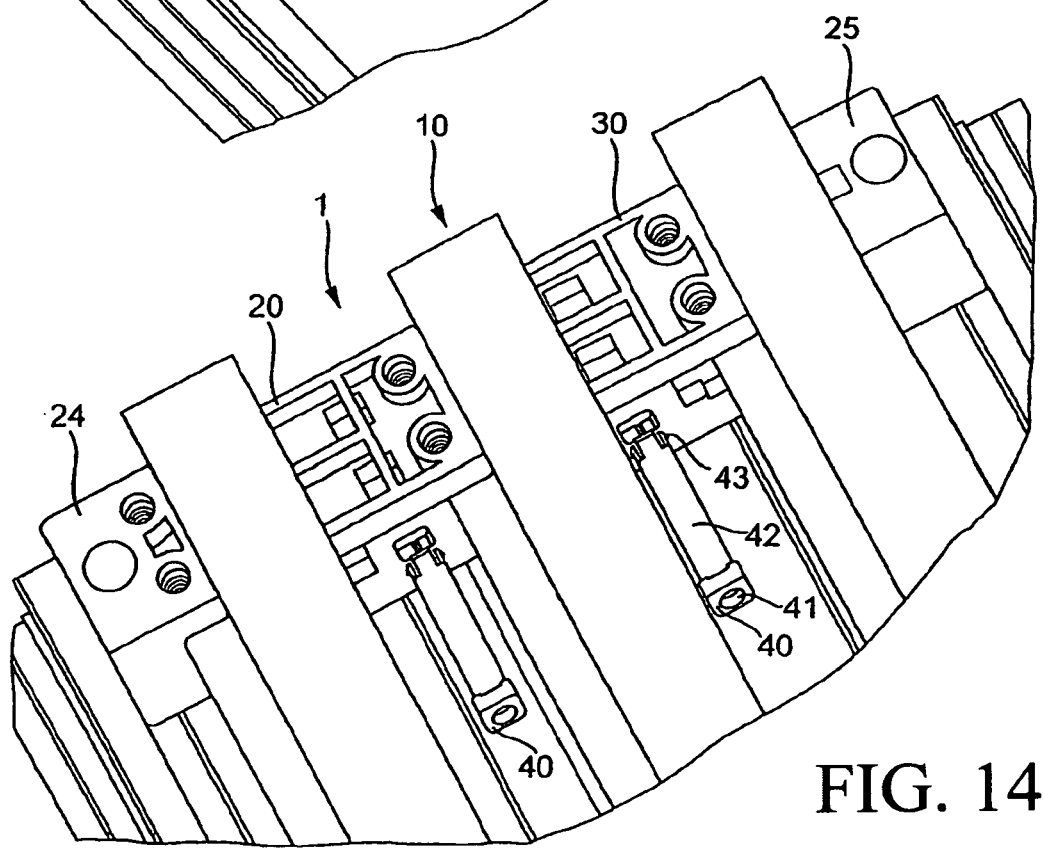
FIG. 14

APPARATUS FOR MOUNTING BUSBARS

BACKGROUND OF THE INVENTION

1. Field of the Invention

This invention relates to a bus bar mounting device having at least one bus bar holder, which can be applied to a support structure and that has at least one base receptacle for inserting a base section of a bus bar and fixing the base section in place by a holding element.

2. Discussion of Related Art

A bus bar mounting device is shown on pages 546, 552 and 553 of the RITTAL Handbook 29 (printed September 1997). With this known bus bar mounting device, bus bars with flat base sections, which laterally project in cross section, are received in matched base receptacles of bus bar holders. The base receptacles are shaped to correspond to the cross section of the base sections and are undercut on both sides. An intermediate section of the bus bars projects out of the bus bar holder through a center longitudinal opening of the base receptacles and, on its end facing away from the bus bar holder, makes a transition into a flat contacting section angled off toward one side. During mounting, a relative longitudinal displacement between the bus bar and the bus bar holder is required for relatively long bus bars of this type.

SUMMARY OF THE INVENTION

One object of this invention is to provide a bus bar mounting device of the type mentioned above but with simplified mounting possibilities.

This object is attained with an apparatus having characteristics described in this specification and in the claims. The holding element can be embodied as a separate element, which can be releasably attached, or is releasably attached, on a base element of the bus bar holder and which, for attachment to a matched holding element receptacle of the base element, has a connecting section and, for fixation in place of the base section, has a head piece extending over the base section.

Thus, it is possible to perform mounting of bus bars in the bus bar holders simply by first mounting the bus bar holders on a platform and then simply inserting the base sections of the bus bars from the front, or from above, into the appropriate base receptacles of the bus bar holder, and then connecting the holding elements with the base element.

Alternative design options exist for a dependable connection which is simple to perform because the holding element receptacle is designed as a hollow space bordered on both sides by wall areas of the base element. The connecting section, as a plug-in section, can be inserted therein or in a reverse manner the holding element receptacle can be designed as a plug-in section and the connecting section as a hollow space receiving it. Thus, it is possible to fix the holding element in place simply and definitely in the connecting section, in a stable manner.

Simple manipulation is enhanced if the distance between the facing longitudinal edges of the contacting sections protruding past or beyond the bus bar holder of two adjoining bus bars is less than the extension of the head piece of the holding element in the longitudinal direction of the bus bar holder. The height of the holding element from its underside facing the base element to its top facing away from the base element is matched to the clearance between the respective contacting section and the base receptacle so that the holding element can be inserted, canted between the facing longitudinal edges of the contacting sections of two adjoining bus bars, can be tilted and then plugged into the base receptacle perpendicularly with respect to the top of the base element.

Those measures contribute to simple manipulation during installation wherein per inserted holding element two portions of the base sections facing each other of two adjoining bus bars overlap.

A simple construction is achieved if the connecting sections and the holding element receptacles have locking devices which work together directly or indirectly via at least one further locking element in order to fix the holding element releasably in place on the base element. Direct fixation in place can occur, for example, with formed-on snap-in elements and counter-snap-in elements as the locking device on the connecting sections or holding element receptacles. An indirect connection can be provided by screws or plug-in pins.

Here, an advantageous embodiment with simple manipulation and secure connection exists if the locking device of the holding element receptacles have pin receivers extending transversely with respect to the longitudinal direction of the bus bar holder. The locking elements of the connecting sections can be fixation openings which, in the plugged-in state, are aligned with the pin receivers. The locking element can have a respective connecting element which can be introduced through the pin receivers and the fixation openings.

In this connection, a simple structure and simple manipulation advantageously result because the connecting element is a connecting pin with a shaft, where on one end a head section and in an other end area at least one snap-in element are arranged.

Those steps contribute to a simple, secure and stable attachment of the bus bars, wherein the two base receptacles which are outermost in the longitudinal direction of the bus bar holder have undercuts formed in end sections on both sides of the base element, into which a lateral portion of the associated base section can be pushed by displacing the bus bar transversely with respect to a longitudinal direction.

Here, an embodiment which is advantageous for fixing the bus bar in place includes, in cross section, the base section of the bus bars having sections of different length on both sides, and the undercuts in the two end sections are formed with different depths corresponding to the portions of different lengths of the base sections.

Mounting with a defined arrangement of the bus bars is favored if an inner base receptacle arranged between two outer base receptacles is matched to the width of the base section.

Manipulation during mounting is helpful if the outer base receptacles are wider than the width of the base section by the length of the respective undercut. It is thus possible to also insert the bus bars simply into the outer base receptacles and then fix them in place by a simple lateral displacement in the longitudinal direction of the bus bar holder, after which the respective holding elements are inserted. The space in the outer base receptacles which is free because of the displacement is filled by a filler, which can be formed on the holding elements.

A stable fixation in place of the bus bars in the bus bar holders can be provided if, in an area projecting past the associated portion of the base section, the head pieces of the holding elements have threaded bores directed perpendicularly with respect to the top of the bus bar holder.

BRIEF DESCRIPTION OF THE DRAWINGS

This invention is explained in greater detail in view of exemplary embodiments, making reference to the drawings, wherein:

FIG. 8 shows the mounting device in accordance with the preceding figures with holding elements inserted, but not fixed in place, in a perspective plan view;

FIG. 9 shows the mounting device in accordance with FIG. 8, with holding elements fixed in place, in a perspective plan view;

FIG. 13 shows a perspective plan view of the holding device, in accordance with FIGS. 11 and 12 without bus bars;

FIG. 14 shows the mounting device in accordance with FIG. 13, with bus bars inserted;

DETAILED DESCRIPTION OF THE INVENTION

Figure 1:
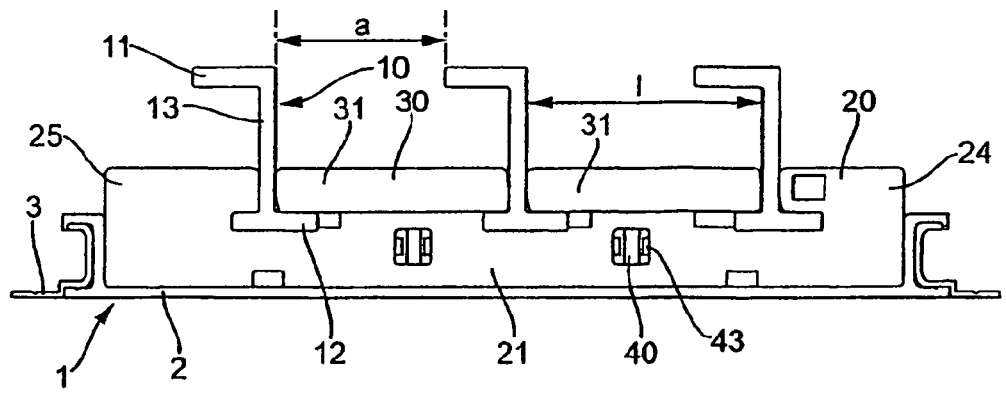
FIG. 1 is a lateral view of a bus bar mounting device with the bus bars inserted into a bus bar holder.

A mounting device 1, or a mounting system for bus bars with a flat platform 2 having lateral edges protruding at right angles with end sections, which are angled toward the outside, and which is held between profiled strips 3, is shown in FIG. 1. The platform 2 itself can be mounted on a suitable support rack and can extend over the entire length of bus bars 10 to be mounted on it, or only over a partial length thereof. Bus bar holders 20, in which the bus bars 10 are fixed in place by base sections 12 extending flat, are attached, for example by screws or by being snapped in, to the platform 2 between the lateral edges, in the present case over the entire width of the platform 2. On their tops, the base sections 12 transition into strip-like intermediate sections 13, which are formed in one piece on them and project at right angles with respect to the top of the bus bar holder 20 and which, at their outward projecting end sections, transition into contacting sections 11, which are laterally angled-off parallel with the mounting level. In another embodiment of the bus bars 10, the angled-off contacting sections 11 can be omitted, so that the contacting sections are formed directly by the free ends of the protruding intermediate sections 13. The base section 12 of a bus bar 10 has a portion on each side of the intermediate section 13, each of which laterally protrudes flange-like and is of different length in the present embodiment, which is also shown in FIGS. 2, 5, 6, 7 and 10.

Figure 2:
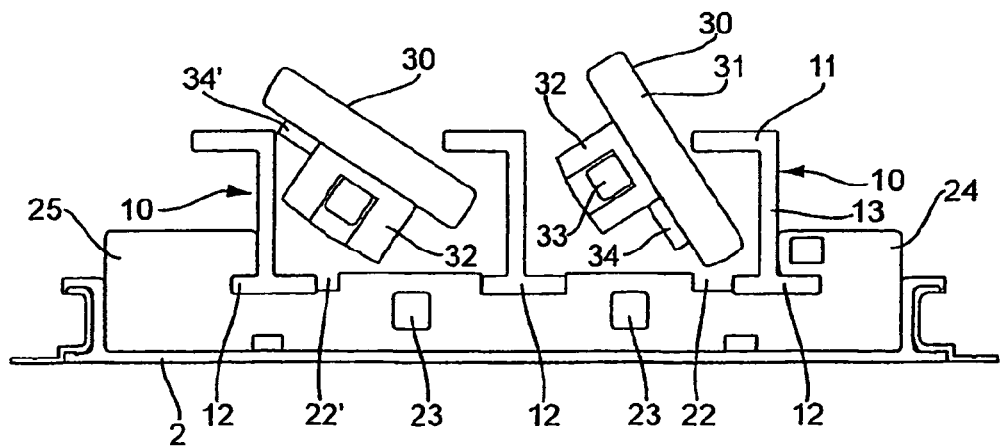
FIG. 2 is a lateral view of the mounting device in accordance with FIG. 1, with holding elements removed.
Figure 3:
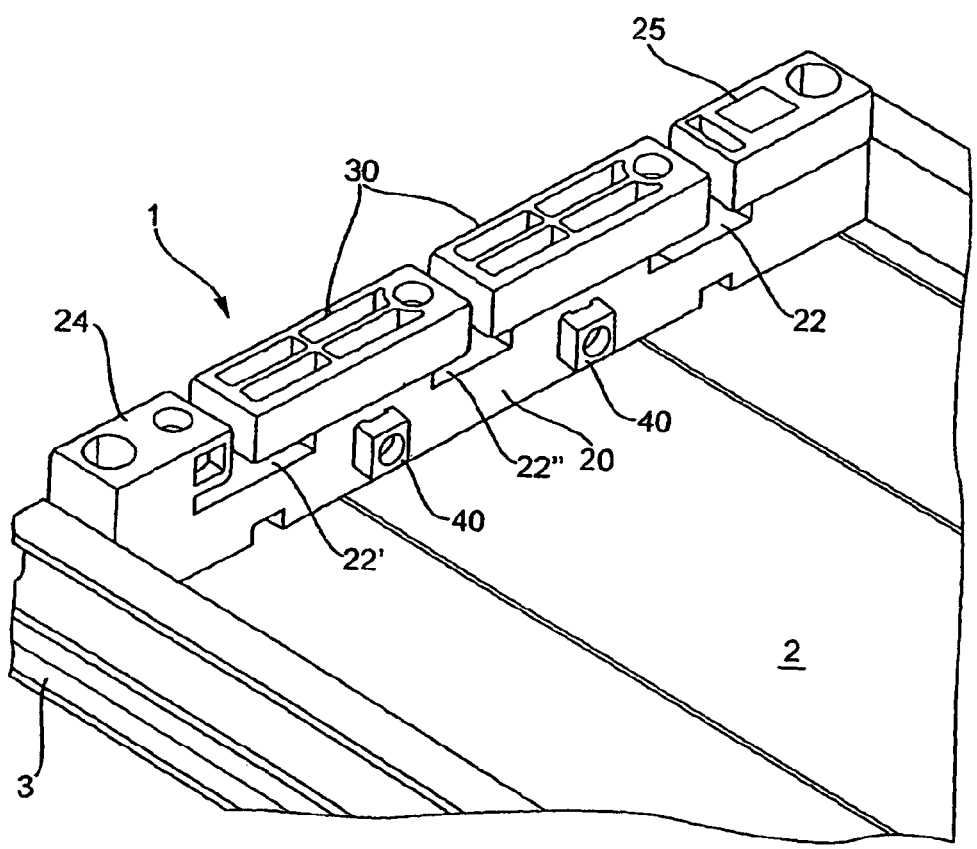
FIG. 3 shows the mounting device in accordance with FIG. 1, in a perspective plan view, without bus bars inserted.
Figure 4:
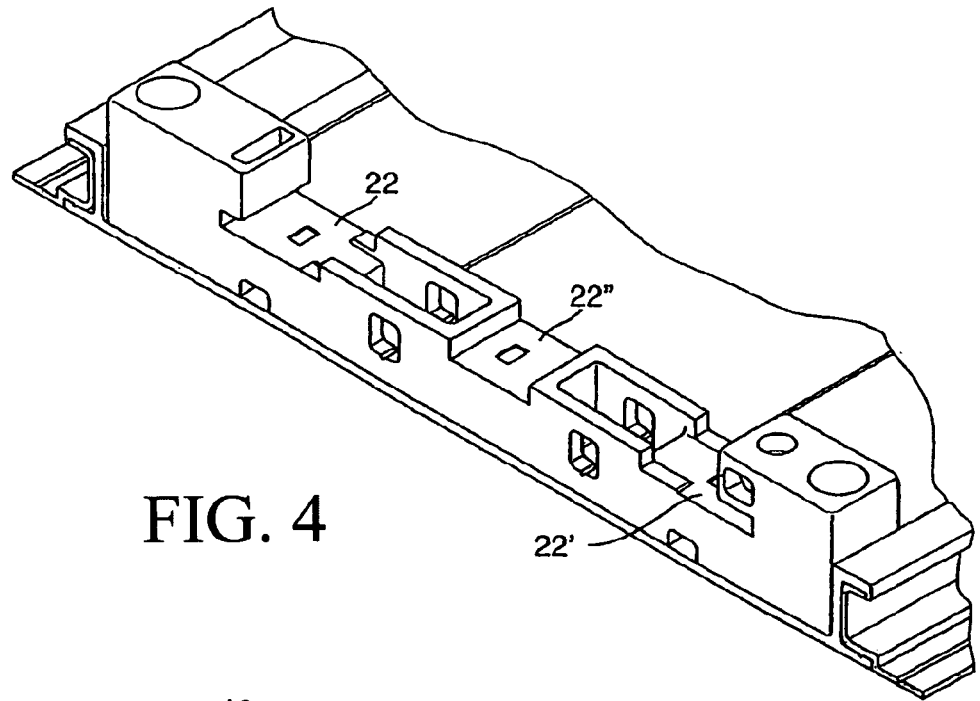
FIG. 4 shows a perspective plan view, without holding elements.
Figure 5:
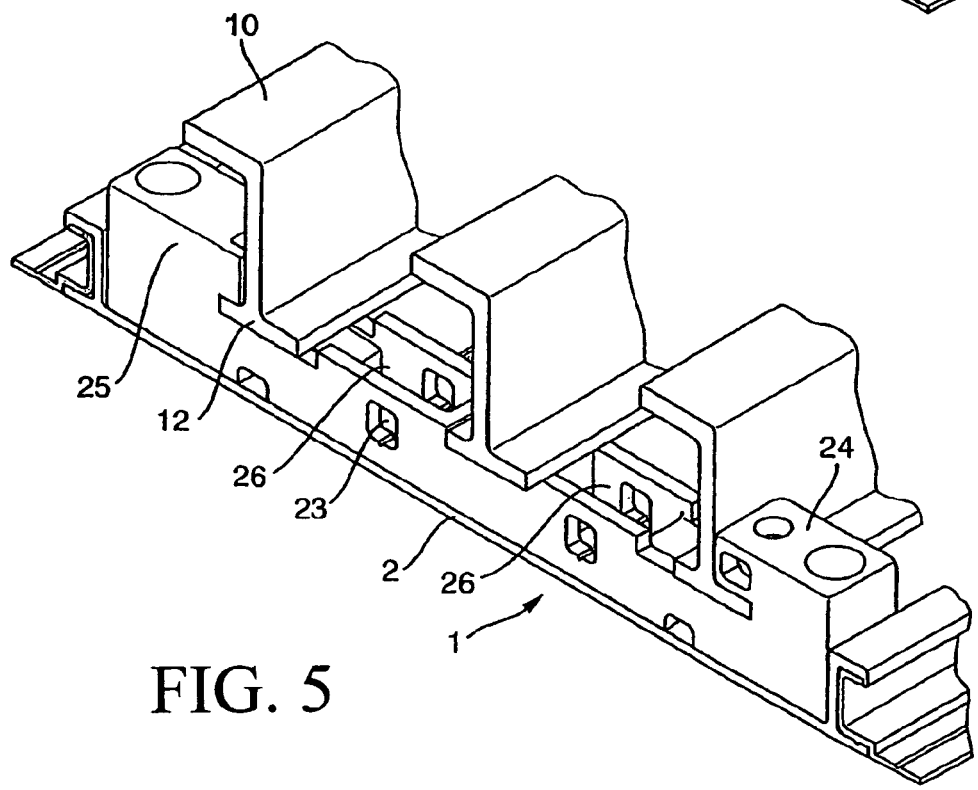
FIG. 5 shows the mounting device in accordance with FIG. 4, with inserted bus bars, in a perspective plan view.
Figure 6:
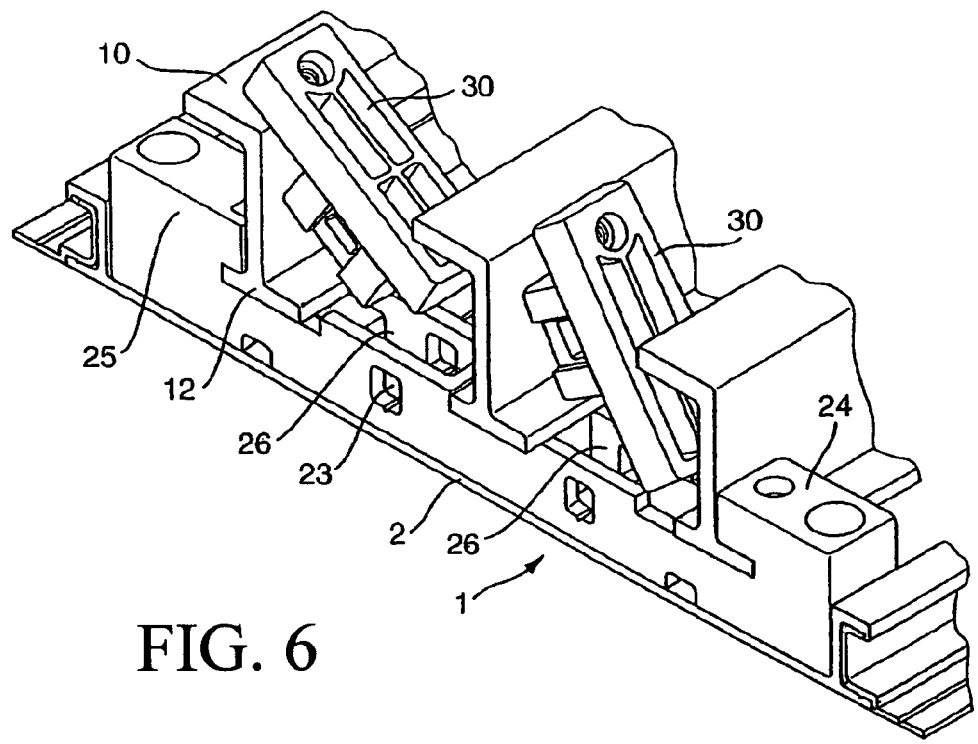
FIG. 6 shows the mounting device in accordance with FIG. 5, with holding elements removed, in a perspective plan view.
Figure 7:
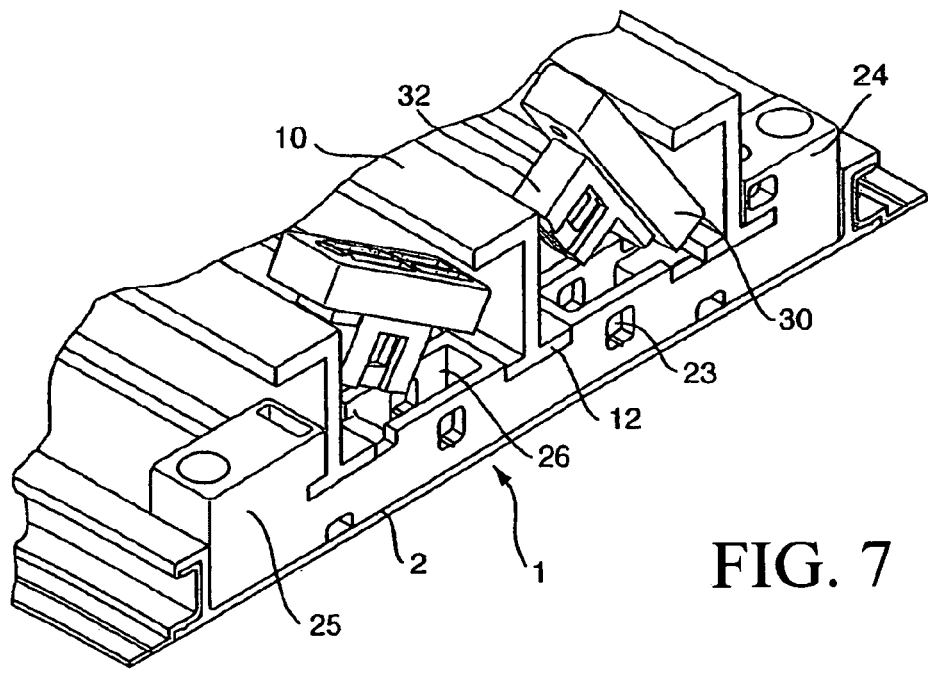
FIG. 7 shows the mounting device in accordance with FIG. 6, in another perspective plan view.
Figure 10:
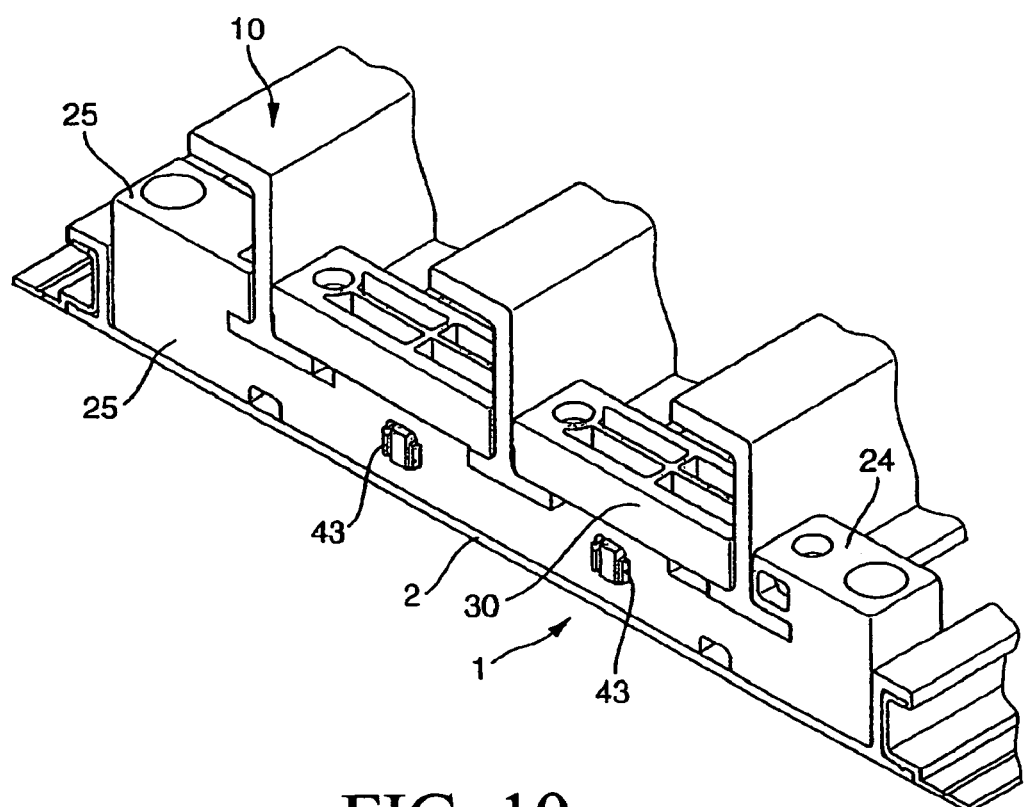
FIG. 10 shows the mounting device in accordance with FIG. 9, in another perspective plan view.
Figure 11:
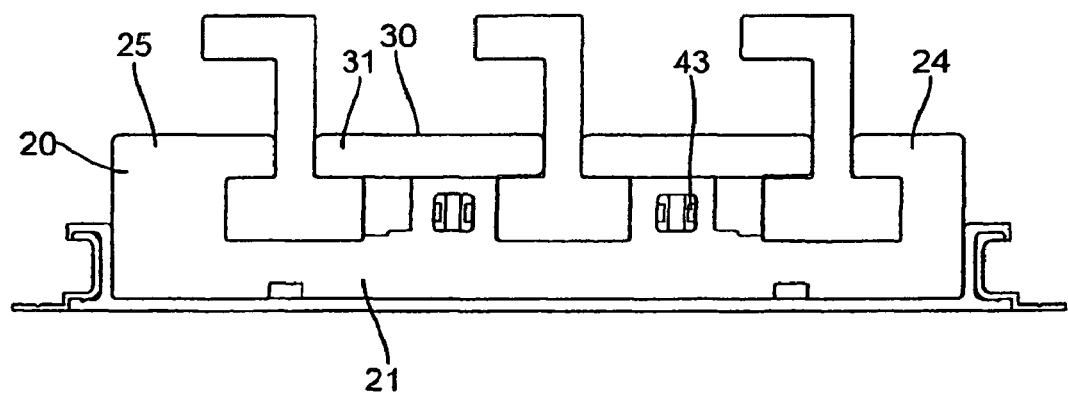
FIG. 11 shows a lateral plan view of another embodiment of the bus bar mounting device, with different bus bars than in FIG. 1.
Figure 12:
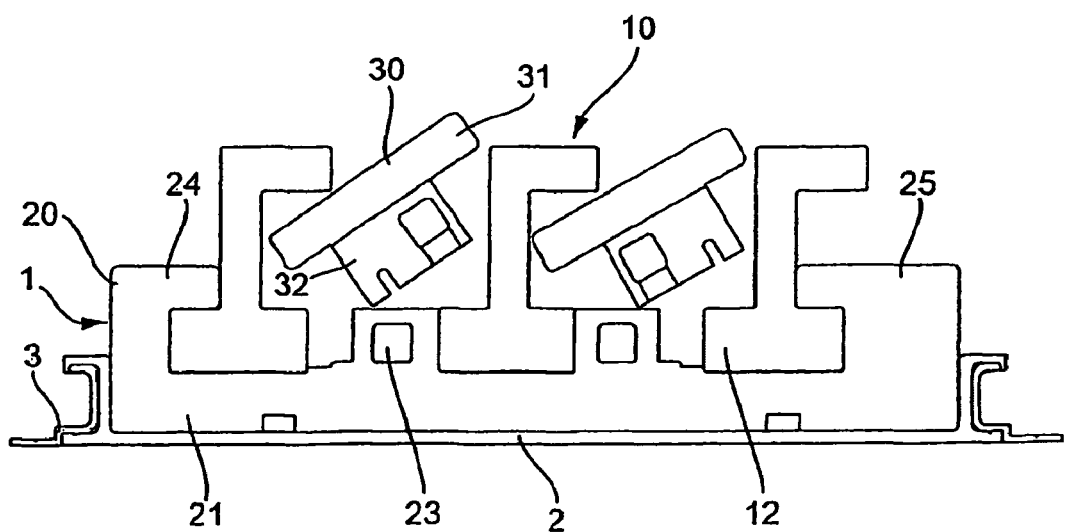
FIG. 12 shows the mounting device in accordance with FIG. 11, with holding elements removed, in a lateral view from the opposite side.
Figure 15:
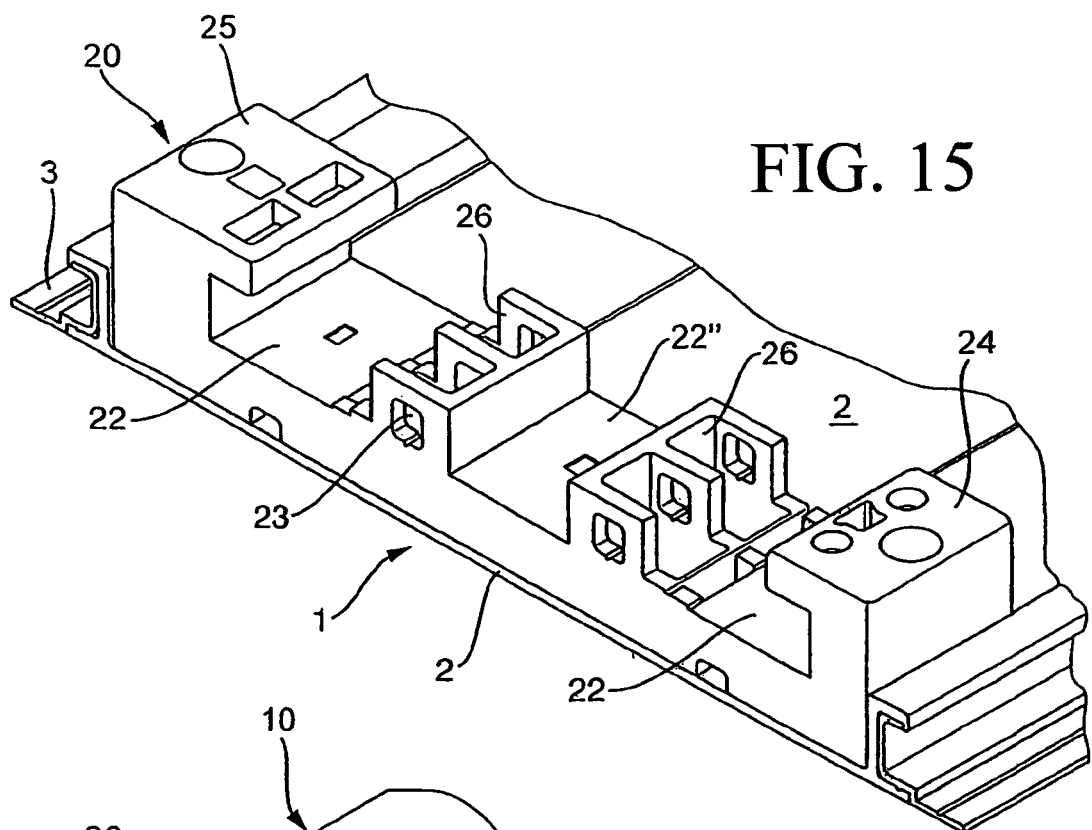
FIG. 15 shows the mounting device in accordance with FIGS. 11 to 14, without bus bars and holding elements, in a perspective plan view.
Figure 16:
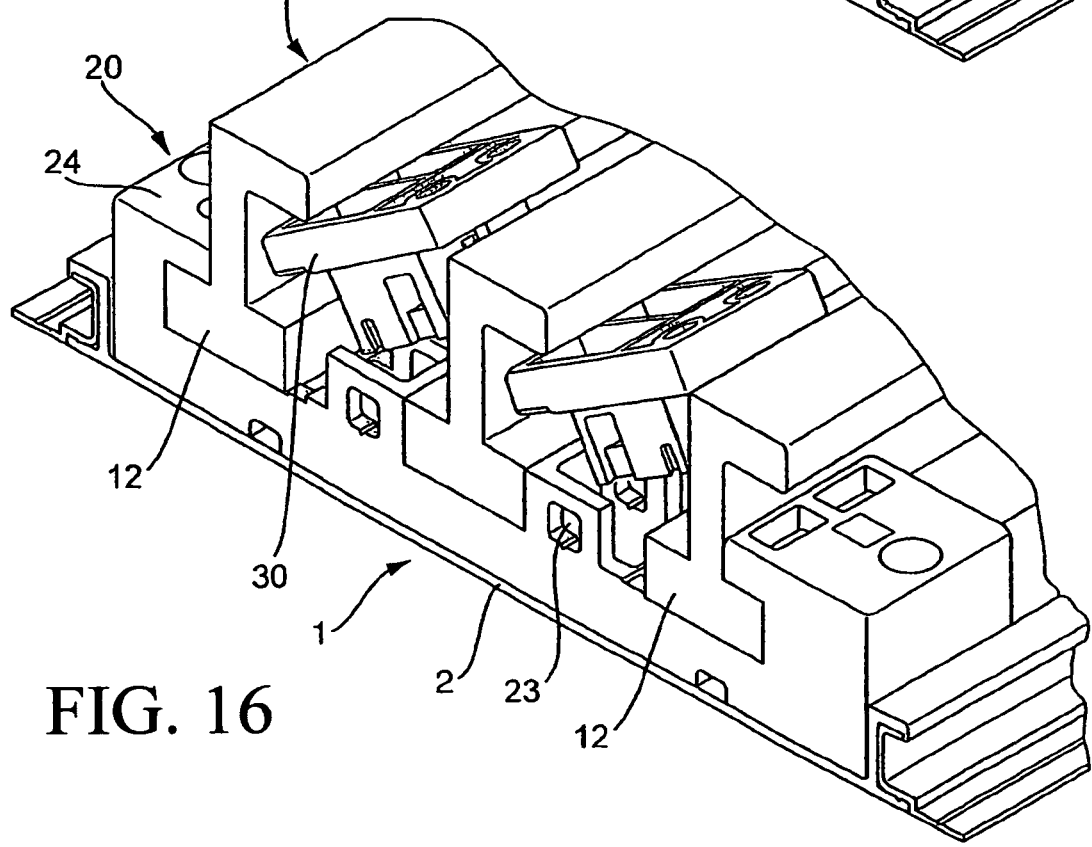
FIG. 16 shows the mounting device in accordance with FIG. 15, with inserted bus bars and with holding elements removed.

As FIG. 1 shows, the bus bar holder 20 substantially comprises a base element 21 with lateral end sections 24 or 25, and of holding elements 30, which are inserted into the base element and are releasably fixed therein. Base receptacles 22, 22', 22", which are matched to the base sections 12 of the bus bars 10, are cut into the base element 21, as shown in FIGS. 2 to 4. The base receptacles 22, 22', which adjoin the two end sections 24, 25 and whose datum level is aligned with that of the center base receptacle 22 parallel with the mounting level, transition toward the end sections 24 or 25 into undercuts made in them, whose depth is matched to the respective length of the facing portion of the base section 12, and a width is also matched perpendicularly with respect to the mounting level to the thickness of the corresponding portions of the respective base sections 12. The widths of the outer base receptacles 22, 22' correspond to the width of the base section 12 plus the depth of the respective undercut. With this layout of the outer base receptacles 20, 20', the bus bars 10 can be inserted in a simple way into the base receptacles 22, 22' perpendicularly with respect to the mounting level, and the respective portion of the base section 12 can be subsequently pushed into the respectively assigned undercut by a lateral movement in the longitudinal direction of the bus bar holder 20 and parallel with the mounting level. The resulting lateral gap in the base receptacle 22 or 22' is afterwards filled by a respectively matched filler which, in the present case, is formed as a filler section 34, 34' on the respective holding element 30, so that in the fixed state a lateral displacement of the bus bars 10 is also dependably prevented, which is shown in FIG. 1, for example.

As shown in FIGS. 1 and 2, a distance a between the facing longitudinal edges of two adjoining bus bars 10 is in this case less than the length 1 of a head piece 31 of the holding element 30. Thus, it is not easily possible with bus bars 10 with an angled-off contacting section 11 to insert the holding element 30 perpendicularly with respect to the mounting level, so instead it is introduced obliquely into the resulting free space between two adjoining bus bars 10, is then pivoted into a horizontal position and is finally inserted with a connecting section 32 perpendicularly with respect to the mounting level into the base element 21. In this case, the length 1 of the head piece 31 substantially corresponds to the distance between the intermediate sections 13 of two adjoining bus bars 10 and its narrow edges, which extend perpendicularly in the inserted state, are advantageously slightly beveled or rounded, so that simple pivoting between the bus bars 10 into the position parallel with the mounting level is possible. Also, the height of the holding element 30 from the underside of the connecting section 32 facing the base element 21 to the top of the head piece 31 facing away from the base element 21 is dimensioned so that the holding element 30 can be inserted without difficulty into a holding element receptacle 26 formed in the base element 21, which can be seen, for example, in FIGS. 6 and 7. The holding element receptacle 26 can be a hollow space with one or several chambers in the base element 21 between two lateral wall sections thereof, and is also bordered by wall sections in the longitudinal direction of the bus bar holder 20, so that the connecting section 32 of the holding element 30, which is essentially matched in cross section to the holding element receptacle 26 is definitely received in the holding element receptacle 26, wherein still further guidance or holding structures can be installed in the hollow space. The connecting section 32 has a continuous fixation opening 33 extending transversely with respect to the bus bar holder 20 which, in the inserted state of the holding element 30, is aligned with pin receivers 23 in the wall sections of the base element 21 bordering the holding element receptacle 26. For fixing the holding element 30 in place, a connecting element 40 with a shaft 42 is pushed through the pin receivers 23 and the fixation opening 33 which, in the end position, rests with a head section 41 against one outside of a wall section of the base element 21 and, by snap-in elements 43 attached to snap-in springs at the other end section of the shaft 42, is snapped together with the oppositely located wall section of the base element 21, as FIGS. 1, 3, 8, 9 and 10 show. In the present case, the pin receivers 23 in the base element 21, as well as the fixation opening 33, are shaped rectangular, in particular square, in cross section, corresponding to the cross section of the shaft area of the connecting element 40. Prior to the insertion of the holding element 30 into the holding element receptacle 26, the connecting element 40 with its snap-in elements 43 can be pre-fixed on a wall section of the base element 21 while keeping the holding element receptacle 26 free, in order to push it in a simple manner through the fixation opening 33 of the holding element 30 after being inserted.

Once the bus bars 10 are fixed in the above described manner in the bus bar holder 20 by the holding elements 30, a final, free-of-play fastening with respective clamping screws can be performed, which are turned into threaded bores 35 in the holding elements 30, or in an end section 24, to which end the threaded bores 35 are arranged perpendicularly to the mounting level by a portion, in the present case the longer portion, of the base section 12.

FIGS. 11 to 16 show a modified exemplary embodiment of the bus bar mounting device, wherein the bus bar holders 20 with the base receptacles 22 formed thereon are matched to bus bars 10 with base sections 12, whose laterally projecting sections are of equal length. Here, the undercuts in the two end sections 24, 25 of the base element 21 are cut to a correspondingly equal depth. Facing away from the undercuts, the base areas of the outer base receptacles are slightly stepped, because the portions of the base section 12 are relatively short and thus a relatively easy introduction of the portions of the base section 12 underneath the undercut is made possible even with the stepping. Here, the stepping of the base level has one advantage of a definite positioning. The recess being created after the insertion into the undercut on the side remote from the latter is again filled, as in the previous exemplary embodiment, by a filler section 34 formed on the connecting section 32 of the holding element 30, so that the base sections 12 introduced into the undercuts are irrevocably fixed in place when the holding element 30 is inserted. With the holding element 30 inserted, the bus bars 10 are also securely fixed in place and can be clamped by the introduction of clamping screws into threaded bores 35.

Also, in contrast to the previously described exemplary embodiment, the bus bar holders 20 in accordance with FIGS. 11 to 16 are reinforced, such as designed widened, wherein the holding element receptacle 26 is embodied as a two-chamber hollow space with a longitudinally oriented separating wall, and the connecting section 32 of the holding elements 30 is correspondingly provided twice. A pin receiver is cut into the separating wall and fixation openings 33 in both portions of the connecting receivers.

In both embodiments of the mounting device, the center base receptacle 22 or 22" arranged between the two outer base receptacles 22, 22', in the system with three bus bars, is made as wide as the base section 12, wherein the respective bus bar 10 is simply inserted perpendicularly with respect to the mounting level. The head pieces 31 of the holding element 30 project on both sides past or beyond the facing portions of the adjoining base sections 12, so that the base sections 12 of two adjoining bus bars 10 are covered by one holding element 30 in the respective sections.

The invention claimed is:

1. A bus bar mounting device having at least one bus bar holder (20) which can be applied to a support structure and having at least one base receptacle (22, 22', 22") for inserting a base section (12) of a bus bar (10) and fixing the base section (12) in place by a holding element (30), the mounting device comprising:

the holding element (30) being a separate releasably attachable on a base element (21) of the bus bar holder (20) and for attachment to a matched holding element receptacle (26) of the base element (21) has a connecting section (32) and for fixation in place of the base section (12) has a head piece (31) extending over the base section (12);

wherein a distance (a) between facing longitudinal edges of contacting sections (11) protruding past the bus bar holder (20) of two adjoining bus bars (10) is less than an extension (1) of the head piece (31) of the holding element (30) in a longitudinal direction of the bus bar holder (20), and a height of the holding element (30) from an underside facing the base element (21) to a top facing away from the base element (21) is matched to a clearance between a respective contacting section (11) and the base receptacle (22, 22', 22") so that the holding element (30) is insertable canted between the facing longitudinal edges of the contacting sections of two adjoining bus bars (10) and is tiltable and then plugged into the base receptacle (22, 22', 22") perpendicularly with respect to the top of the base element (21).

2. The mounting device in accordance with claim 1, wherein the holding element receptacle (26) is a hollow space bordered on both sides by wall areas of the base element (21) and the connecting section (32) is a plug-in section insertable in the hollow space, or the holding element receptacle (26) is a plug-in section and the connecting section is a hollow space receiving the plug-in section.

3. The mounting device in accordance with claim 2, wherein the inserted holding element (30) has two portions of base sections (12) facing each other of two adjoining bus bars (10) that overlap.

4. The mounting device in accordance with claim 3, wherein the connecting sections (32) and the holding element receptacles (26) have locking devices working together via at least one further locking element to fix the holding element (30) releasably in place on the base element (21).

5. The mounting device in accordance with claim 4, wherein the locking device of the holding element receptacles (26) comprise pin receivers (23) extending transversely with respect to the longitudinal direction of the bus bar holder (20), and the locking devices of the connecting sections (32) have fixation openings (33) which, in the plugged in state, are aligned with the pin receivers (23), and the further locking element comprises a respective connecting element (40) which is introducible through the pin receivers (23) and the fixation openings (33).

6. The mounting device in accordance with claim 5, wherein the connecting element (40) is a connecting pin with a shaft (42) having on one end a head section (41) and in an other end area at least one snap-in element (43).

7. The mounting device in accordance with claim 6, wherein the base receptacles (22, 22') outermost in the longitudinal direction of the bus bar holder (20) have undercuts formed in end sections (24, 25) on both sides of the base element (21), into which a lateral portion of an associated base section (12) is pushed by displacing the bus bar (20) transversely with respect to the longitudinal direction.

8. The mounting device in accordance with claim 7, wherein in a cross section the base section (12) of the bus bars (20) has sections each of a different length on both sides, and the undercuts in the two end sections are formed with different depths corresponding to the portions of different lengths of the base sections (12).

9. The mounting device in accordance with claim 8, wherein an inner base receptacle (22") arranged between two outer base receptacles (22, 22') is matched to a width of the base section (12).

10. The mounting device in accordance with claim 9, wherein the outer base receptacles (22, 22') are wider than the width of the base section (12) by a length of the respective undercut.

11. The mounting device in accordance with claim 10, wherein in an area projecting past the associated portion of the base section (12) the head pieces (31) of the holding elements (30) have threaded bores (35) directed perpendicularly with respect to the top of the bus bar holder (20).

12. The mounting device in accordance with claim 1, wherein the connecting sections (32) and the holding element receptacles (26) have locking devices working together via at least one further locking element to fix the holding element (30) releasably in place on the base element (21).

13. The mounting device in accordance with claim 1, wherein in an area projecting past the associated portion of the base section (12) the head pieces (31) of the holding elements (30) have threaded bores (35) directed perpendicularly with respect to the top of the bus bar holder (20).

14. A bus bar mounting device having at least one bus bar holder (20) which can be applied to a support structure and having at least one base receptacle (22, 22', 22") for inserting a base section (12) of a bus bar (10) and fixing the base section (12) in place by a holding element (30), the mounting device comprising:
the holding element (30) being a separate releasably attachable on a base element (21) of the bus bar holder (20) and for attachment to a matched holding element receptacle (26) of the base element (21) has a connecting section (32) and for fixation in place of the base section (12) has a head piece (31) extending over the base section (12), wherein the inserted holding element (30) has two portions of base sections (12) facing each other of two adjoining bus bars (10) that overlap.

15. The mounting device in accordance with claim 14, wherein the holding element receptacle (26) is a hollow space bordered on both sides by wall areas of the base element (21) and the connecting section (32) is a plug-in section insertable in the hollow space, or the holding element receptacle (26) is a plug-in section and the connecting section is a hollow space receiving the plug-in section.

16. A bus bar mounting device having at least one bus bar holder (20) which can be applied to a support structure and having at least one base receptacle (22, 22', 22") for inserting a base section (12) of a bus bar (10) and fixing the base section (12) in place by a holding element (30), the mounting device comprising:
the holding element (30) being a separate releasably attachable on a base element (21) of the bus bar holder (20) and for attachment to a matched holding element receptacle (26) of the base element (21) has a connecting section (32) and for fixation in place of the base section (12) has a head piece (31) extending over the base section (12), wherein the base receptacles (22, 22') outermost in the longitudinal direction of the bus bar holder (20) have undercuts formed in end sections (24, 25) on both sides of the base element (21), into which a lateral portion of the associated base section (12) is pushed by displacing the bus bar (20) transversely with respect to the longitudinal direction.

17. The mounting device in accordance with claim 16, wherein a distance (a) between facing longitudinal edges of contacting sections (11) protruding past the bus bar holder (20) of two adjoining bus bars (10) is less than an extension (1) of the head piece (31) of the holding element (30) in a longitudinal direction of the bus bar holder (20), and a height of the holding element (30) from an underside facing the base element (21) to a top facing away from the base element (21) is matched to a clearance between a respective contacting section (11) and the base receptacle (22, 22', 22") so that the holding element (30) is insertable canted between the facing longitudinal edges of the contacting sections of two adjoining bus bars (10) and is tiltable and then plugged into the base receptacle (22, 22', 22") perpendicularly with respect to the top of the base element (21).

18. The mounting device in accordance with claim 16, wherein an inner base receptacle (22") arranged between two outer base receptacles (22, 22') is matched to a width of the base section (12).

19. The mounting device in accordance with claim 16, wherein the outer base receptacles (22, 22') are wider than the width of the base section (12) by a length of the respective undercut.

20. The mounting device in accordance with claim 16, wherein the holding element receptacle (26) is a hollow space bordered on both sides by wall areas of the base element (21) and the connecting section (32) is a plug-in section insertable in the hollow space, or the holding element receptacle (26) is a plug-in section and the connecting section is a hollow space receiving the plug-in section.

* * * * *